United States Patent [19]
Costello

[11] Patent Number: 5,346,617
[45] Date of Patent: Sep. 13, 1994

[54] METHOD AND APPARATUS FOR PURIFYING WASTE WATER

[76] Inventor: Burton W. Costello, 6780 Schooner Bay Cir., Sarasota, Fla. 34231

[21] Appl. No.: 852,784

[22] Filed: Mar. 17, 1992

[51] Int. Cl.$^5$ .............................................. C02F 1/78
[52] U.S. Cl. ................................... 210/192; 210/199; 210/202; 210/259; 210/266; 210/748; 210/760; 210/764; 210/195.1; 210/275
[58] Field of Search ............... 210/760, 763, 762, 206, 210/764, 192, 748, 266, 259, 199, 202, 275; 422/24, 186.07

[56] References Cited

U.S. PATENT DOCUMENTS

| | | | |
|---|---|---|---|
| 2,581,125 | 1/1952 | Morrison | 210/282 |
| 3,442,802 | 5/1969 | Hamilton et al. | 210/763 |
| 3,448,045 | 6/1969 | Hess et al. | 210/760 |
| 3,487,016 | 12/1969 | Zeff | 210/760 |
| 3,779,909 | 12/1973 | Wisfeld et al. | 210/760 |
| 3,853,764 | 12/1974 | Armstrong | 210/519 |
| 3,998,714 | 12/1976 | Armstrong | 210/758 |
| 4,007,118 | 2/1977 | Ciambrone | 210/760 |
| 4,019,986 | 4/1977 | Burris et al. | 210/139 |
| 4,029,578 | 6/1977 | Turk | 210/763 |
| 4,040,982 | 8/1977 | Basila et al. | 210/760 |
| 4,156,652 | 5/1979 | Wiest | 210/760 |
| 4,176,061 | 11/1979 | Stopka | 210/760 |
| 4,224,155 | 9/1980 | Milne | 210/474 |
| 4,250,040 | 2/1981 | LaRaus | 210/760 |
| 4,274,966 | 6/1981 | Palmer | 210/763 |
| 4,430,306 | 2/1984 | Namba et al. | 210/760 |
| 4,512,900 | 4/1985 | Macur et al. | 210/760 |
| 4,548,716 | 10/1985 | Boeve | 210/760 |
| 4,751,005 | 6/1988 | Mitsui et al. | 210/760 |
| 4,764,281 | 8/1988 | Elfine | 210/668 |
| 4,800,024 | 1/1989 | Elfine | 210/665 |
| 4,846,978 | 7/1989 | Leggett et al. | 210/748 |
| 4,851,131 | 7/1989 | Grabiak et al. | 210/763 |
| 4,863,608 | 9/1989 | Kawai et al. | 210/748 |
| 4,970,005 | 11/1990 | Schuchardt | 210/760 |
| 5,043,080 | 8/1991 | Cater et al. | 210/748 |
| 5,078,889 | 1/1992 | Higgins et al. | 210/688 |
| 5,082,570 | 1/1992 | Higgins et al. | 210/688 |
| 5,114,576 | 5/1992 | Ditzler et al. | 210/195.1 |
| 5,116,574 | 5/1992 | Pearson | 210/760 |
| 5,120,436 | 6/1992 | Reichner | 210/519 |
| 5,135,654 | 8/1992 | Heskett | 210/763 |
| 5,154,836 | 10/1992 | Clough | 210/747 |
| 5,190,659 | 3/1993 | Wang et al. | 210/663 |
| 5,192,452 | 3/1993 | Mitsui et al. | 210/760 |
| 5,236,595 | 8/1993 | Wang et al. | 210/669 |
| 5,266,196 | 11/1993 | Fife et al. | 210/416.3 |
| 5,273,664 | 12/1993 | Schulz | 210/759 |

OTHER PUBLICATIONS

Maine Telegram, Ozone Purifies Water in New Plant, Dec. 5, 1993, 4 pages.
Rip G. Rice & Aharon Netzer (Ann Arbor Science), Handbook of Ozone Technology and Applications, pp. 20, 308, 312 & 336 (1982).
Wedeco Environmental Technologies Water-Soil-Air, Ozone/UV-Combinated Hydrocarbon Elimination.

*Primary Examiner*—Cynthia L. Nessler

[57] ABSTRACT

A system and method for the purifying of water passing through the system, the system comprising in combination a plurality of containers; a quantity of particulate material formed of trace mineral granules located within the containers and adapted to remove contaminants from water contacting the granules as the water passes through the containers; a plurality of pipes for feeding water to the first container, and then sequentially to each subsequent container, and then from the last container; injectors operatively associated with the plurality of pipes in advance of the containers to inject ozone into the water prior to the feeding of water to the containers; and pump means to feed water through the pipes and containers in a continuous and automatic cycle of operation.

1 Claim, 5 Drawing Sheets

METHOD AND APPARATUS FOR PURIFYING WASTE WATER

BACKGROUND OF THE INVENTION

1. Field of the Invention

This invention relates to a method and apparatus for purifying waste water, and more particularly, to purifying waste water with reaction chambers having ozone injectors in advance of each of the chamber.

2. Description of the Background Art

In the field of waste water treatment, great efforts are continuously being made to reduce the quantity and concentration of pollutants found in waste water being discharged into rivers, lakes, oceans, ground water supplies, etc. This is evidenced by more and stricter governmental regulations and requirements relating to waste water treatment processes and discharges. The quantities of human and industrial wastes requiring treatment are constantly and rapidly increasing. Concurrently, the levels of waste found within effluent from treatment plants must be reduced to increasingly lower limits as mandated by governmental regulations.

Organic materials commonly found within waste water have the ability to act as nutrients for microorganisms which remove the free oxygen within a water supply. The organic nutrient materials deprive the higher living organisms, normally found in the water, the opportunity to utilize the free oxygen in the water. This process is called eutrophication. The outcome of this eutrophic process results in a body of water that can only support bacterial life, especially sulfur bacteria. All higher life forms such as fish and higher plants cannot live in a eutrophied body of water.

Many methods exist for the treatment of waste water. Biological or chemical treatment of the waste water to effect removal of the harmful elements or compounds within the waste water are common methods employed to reduce contaminant loading found in waste water. Biological treatment of waste water requires large expensive tanks for micro organisms to consume the biological waste contained within the waste water. The process requires the waste water to stand for a long period of time to allow the micro organisms to consume the waste materials while the water is aerated. Additionally, the micro organisms must be attended carefully and constantly so as to avoid their death. Microorganisms are sensitive to their environment, a global of microorganisms renders the waste water treatment system ineffective until new microorganisms can be added to the system.

Furthermore, before a chemical treatment can be effective, the type of pollutants must be identified so that the proper removal techniques can be chosen for the waste water. This sometimes requires the addition of reactant chemicals or flocculants. Failure to identify or properly identify the type of pollutants within the waste water results in a lack of treatment of pollutants in the waste water and a further pollution of the waste water with the unconsumed improper chemical additive.

Initially, waste water is commonly filtered through media such as sand. This removes humus and grit. Additionally, other methods of treating waste water include the evaporation of the waste water from sludge pumped from Imhoff comes as in sewage treatment plants. The dried waste or sludge is then burned or incinerated. However, incineration requires large and complex facilities to be constructed in order for large amounts of waste water to be evaporated. Furthermore, incineration may be ineffective for waste water containing small amounts of pollutants. Incineration also drive pollutants from the sludge into the atmosphere creating another problem.

Accordingly, the present invention is directed to improving methods and apparatus for the purifying of water. It is adapted for use with waste water, ground water and surface water for treatment and recycling, producing a clean water discharge from polluted water sources, for immediate re-use of the water, all in a manner which is safe, secure, economical, and aesthetically pleasing.

As illustrated by the background art, efforts are continuously being made in an attempt to improve methods and apparatus for purifying waste water. No prior effort, however, provides the benefits attendant with the present invention. Additionally, the known and commercial techniques do not suggest the present inventive combination of component elements and method steps arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

Therefore, it is an object of this invention to provide a system and method for the purifying of water passing through the system, the system comprising in combination a plurality of containers; a quantity of particulate material formed of trace mineral granules located within the containers and adapted to remove contaminants from water contacting the granules as the water passes through the containers; a plurality of pipes for feeding water to the first container, and then sequentially to each subsequent container, and then from the last container; injectors operatively associated with the plurality of pipes in advance of the containers to inject ozone into the water prior to the feeding of water to the containers; and pump means to feed water through the pipes and containers in a continuous and automatic cycle of operation.

Another object of this invention is to readily provide methods and apparatus for purifying water which is safe, secure, convenient, maintenance free and economical.

A further object of this invention is to purify waste water which is free of particulate material as well as bacteria and viruses.

A further object of the invention is to easily install on site a system to produce clean water discharges of polluted water sources.

A further object of this invention is that it may be backwashed in a closed loop configuration whereby the water treatment system has a quality of self cleaning.

A further object of this invention is to inject ozone into lines of a waste water treatment system with apparatus to allow flow reversal for back wash.

The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with the specific embodiment shown in the attached drawings. For the purpose of summarizing the invention, the invention may be incorporated into a system for the purifying of water passing through the system, the system comprising in combination a plurality of vertically extending catalytic reaction chambers; a quantity of particulate material formed of trace mineral granules located within each of the chambers and adapted to remove contaminants from water contacting the granules as the water passes through the chambers; a plurality of pipes for feeding water to the first chamber, and then sequentially to each subsequent chamber, and then from the last chamber; injectors operatively associated with the plurality of pipes in advance of each of the chambers to inject ozone into the water prior to the feeding of water to the chambers; a sand filter to receive water prior to being fed to the first injector and chamber for the removal of particulate material; an ultra violet device to receive water after being fed from the last of the chambers for the production of hydroxyls in combination with ozone that provide a continuing oxidation and disinfection process; an extended pipe assembly following the ultra violet device with tubing coupling the chambers and extended pipe assembly for injecting reside ozone from the chambers to the extended pipe assembly for continuous oxidation and ozonation, the extended pipe assembly being constructed in a stacked configuration to constitute an enclosure for the chambers; a carbon filter to receive the water after being fed from the extended pipe assembly for the polishing of the water; a back wash tank to receive and store water for back washing the system; and pump means to feed water through the plurality of pipes, sand filter, chambers, injectors, extended pipe assembly, carbon filter and back wash tank in a continuous and automatic cycle of operation.

The invention may also be incorporated into a system for the purifying of water passing therethrough, the system comprising in combination a plurality of containers; a quantity of particulate material formed of trace mineral granules located within the containers and adapted to remove contaminants from water contacting the granules as the water passes through the containers; a plurality of pipes for feeding water to the first container, and then sequentially to each subsequent container, and then from the last container; injectors operatively associated with the plurality of pipes in advance of the containers to inject ozone into the water prior to the feeding of water to the containers; and pump means to feed water through the pipes and containers in a continuous and automatic cycle of operation.

The system further includes a sand filter with an ozone injector in advance thereof to receive water prior to being fed to the first injector and container for the removal of particulate material. The system further includes an ultra violet device to receive water after being fed from the last of the containers for the production of hydroxyls in combination with ozone that provide a continuing oxidation and disinfection process. The system further includes an extended pipe assembly to receive water after being fed from the ultra violet device with tubing coupling the containers and extended pipe assembly for injecting reside ozone from the containers to the extended pipe assembly for the purpose of increasing the total contact time between the water and ozone and for space efficiency. The system further includes a carbon filter to receive the water after being fed from the extended pipe assembly for the polishing of the water. The extended pipe means are assembled in a stacked configuration to constitute an enclosure for the containers. The plurality of pipes are arranged to feed water into the containers adjacent to their tops and to feed water from the containers adjacent to their bottoms. The system further includes a supplemental pump to reverse the flow of water through the system for back washing.

The system further includes a back wash tank to receive and store water for back washing the system.

The invention may also be incorporated into apparatus for injecting ozone into a pipe containing flowing water to be ozonated, the pipe means having a major section of predetermined inner diameter and minor section of an enlarged inner diameter to form an annular chamber, the major section and the minor section and the chamber having a common axis, a torus-shaped hollow tube located within the annular chamber, the inner diameter of the tube being substantially the same as the inner diameter of the major section, the outer diameter of the tube being substantially the same as the inner diameter of the minor section, a plurality of inwardly facing apertures formed through the interior surface of the tube facing the axis of the pipe and means to feed ozone into the interior of the tube for being fed through the apertures into water flowing through the pipe thereby effecting a high rate of mass transfer while allowing for flow reversal. The apertures have a diameter of between about 1/16 and 1/32 inches.

The invention may also be incorporated into a modular system for the purifying of water, the system comprising in combination a plurality of water purifying chambers, the chambers being supports on modules for being grouped together in a configuration for a particular application; a quantity of particulate material formed of trace mineral granules located within at least some of the chambers and adapted to remove contaminants from water contacting the granules as the water passes through the chambers; a plurality of pipes for feeding water to the first chamber, and then sequentially to each subsequent chamber, and then from a subsequent chamber; an extended pipe assembly operatively coupled to receive water from the subsequent chamber, the extended pipe assembly being configured in a stacked configuration to constitute an enclosure for the chambers; injectors operatively associated with the extended pipe assembly to inject ozone into the water flowing through the extended pipe assembly; and pump means to feed water through the pipes and chambers in a continuous and automatic cycle of operation.

The system further includes means to inject ozone into the water being fed to those chambers with granules. The system further includes tubing coupling the injectors and those chambers with granules whereby the residual ozone in such containers constitutes the source of ozone for the injectors. The system further includes a backwash tank to receive and store water for back washing the system.

The invention may also be incorporated into a method of purifying flowing water comprising in combination, the steps of providing a container; loading a quantity of particulate material formed of trace mineral granules within container, the particulate material being adapted to remove contaminants from the water when such water flows in contact with the particulate material; feeding water to the container by a first pipe; injecting ozone into the water flowing through the first pipe for an initial oxidation prior to the feeding of the water to the container; further purifying the water by feeding the ozonated water from the first pipe to the container in flowing contact with the granules; feeding the further purified water from the container through a second pipe; and additionally purifying the water when flowing through the second pipe by injecting residual ozone from the container into the second pipe.

The invention may also be incorporated into a method of purifying flowing water comprising, in combination, the steps of providing a plurality of containers; loading a quantity of particulate material formed of trace mineral granules within each container, the particulate material being adapted to remove contaminants from the water by catalytic conversion when the water to be purified flows in contact with the granules; providing a plurality of pipes for feeding water to the first container, and then sequentially to each subsequent container, and then from the last container; feeding water from one of the pipes into the first container for the removal by catalytic conversion from the water of loosely bonded contaminants; feeding water from another of the pipes from the first container to the second container for the removal from the water by catalytic conversion of intermediately bonded contaminants along with any residual loosely bonded contaminants not removed in the first container; and feeding water from others of the pipes from the second container to the third and subsequent containers for the removal from the water by catalytic conversion of tightly bonded contaminants along with any residual loosely and intermittently bonded contaminants not removed in the first and second containers. The method further includes the step of ozonating the water prior to its introduction into each chamber.

Lastly, the invention may also be incorporated into a method of back washing a water purification system comprising the steps of providing a water purification chamber; providing an input line to feed a flow of water to be purified to the chamber and an output line to feed a flow of purified water from the chamber to exterior of the system in a water purification path; providing a back wash tank out of the water purification path; providing supplemental lines to couple the back wash tank with the input and output lines and with valves at the points of coupling of the input and output lines with the supplemental lines in order to direct the flow of water through the chamber and the back wash tank in a reverse back wash cycle; positioning a filter between the input line and the back wash tank; feeding a flow of water through the chamber and out of the system in a water purification path; and reversing the valves and feeding water through the system in a closed loop reverse path for effecting the back washing of the chamber.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and apparatus may be readily utilized as a basis for modifying or designing other methods and apparatus for carrying out the same purposes of the present invention. It should be realized by those skilled in the art that such equivalent methods and apparatus do not depart from the spirit and scope of the invention as set forth in the appended claims.

BRIEF DESCRIPTION OF THE DRAWINGS

For a fuller understanding of the nature and objects of the present invention, reference should be had to the following detailed description taken in conjunction with the accompanying drawings in which.

Similar reference characters refer to similar parts throughout the several Figures.

DETAILED DESCRIPTION OF THE INVENTION

Figure 1:
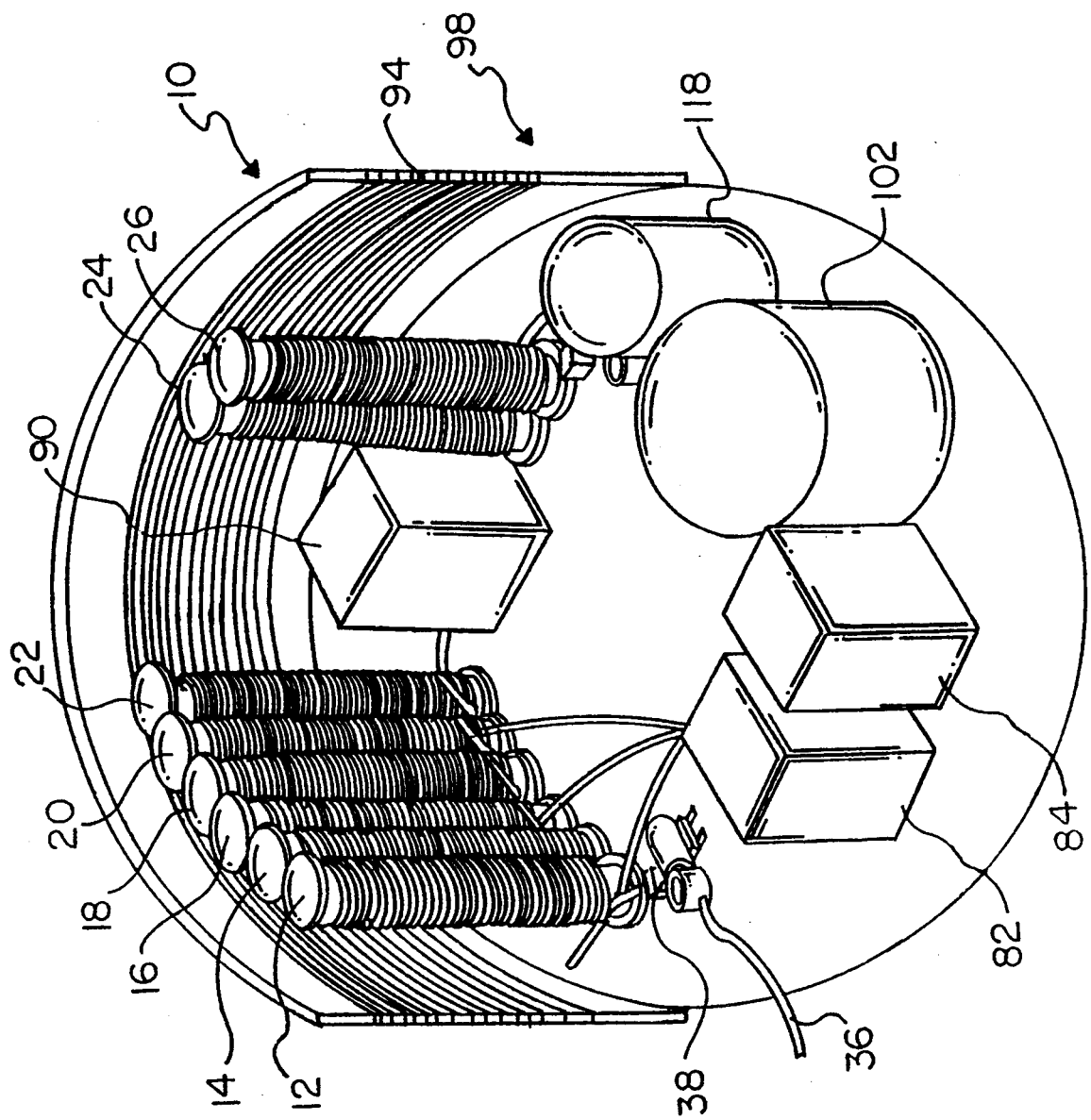
FIG. 1 is a perspective view of a system constructed in accordance with the principles of the present invention with parts removed to show certain internal constructions.
Figure 2:
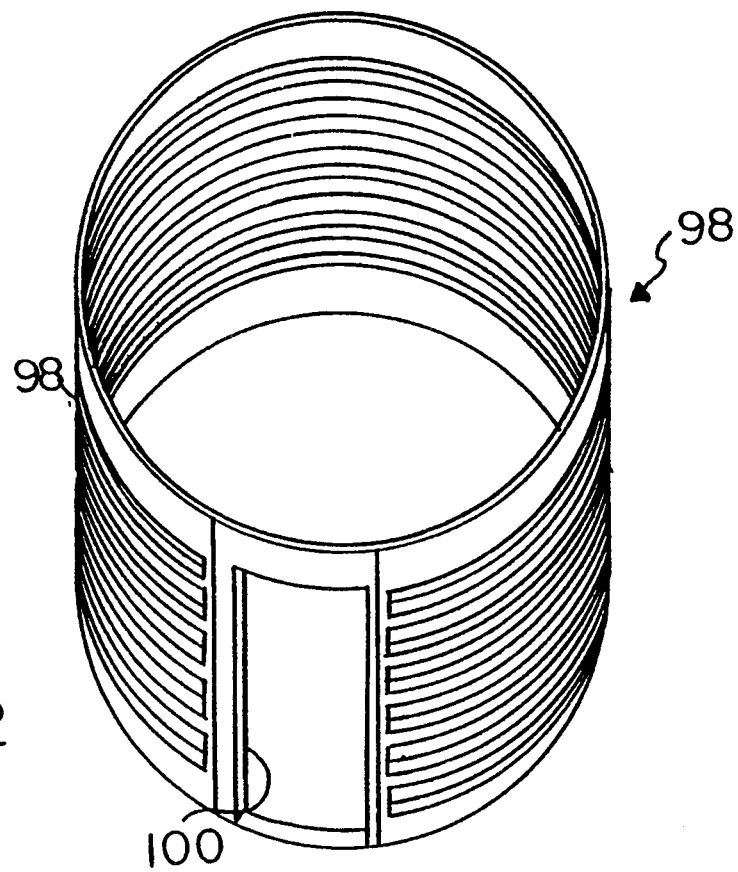
FIGS. 2 and 3 are a perspective views of the apparatus of FIG. 1, FIG. 2 has the internal parts removed to show greater details of the external parts.
Figure 3:
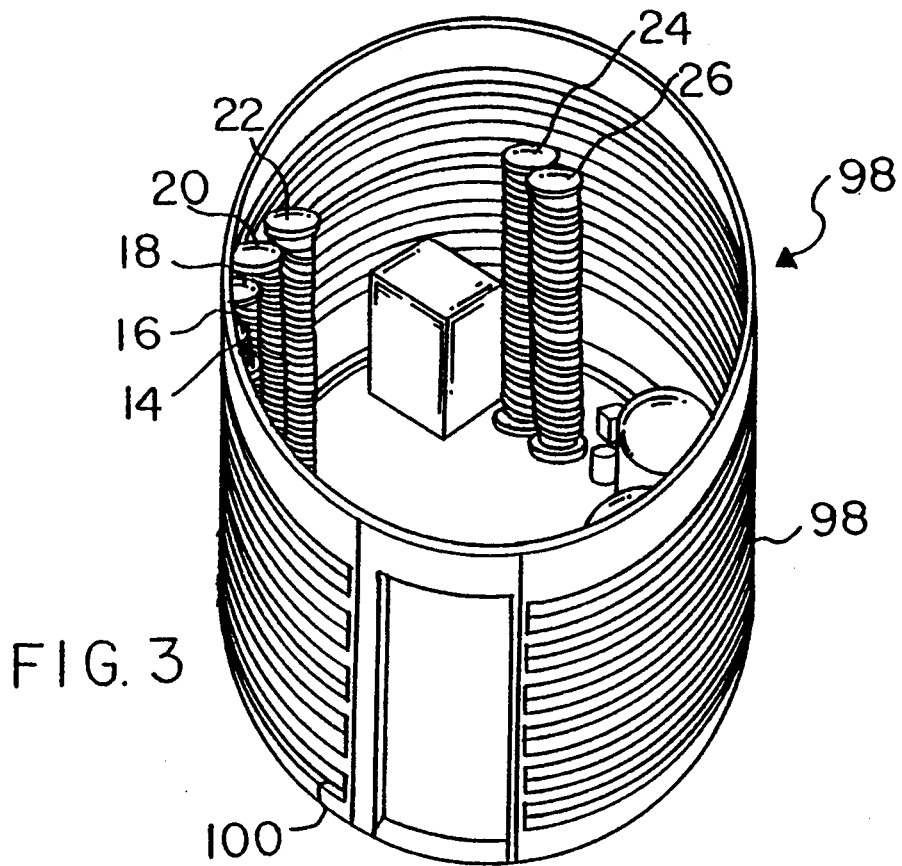
Figure 4:
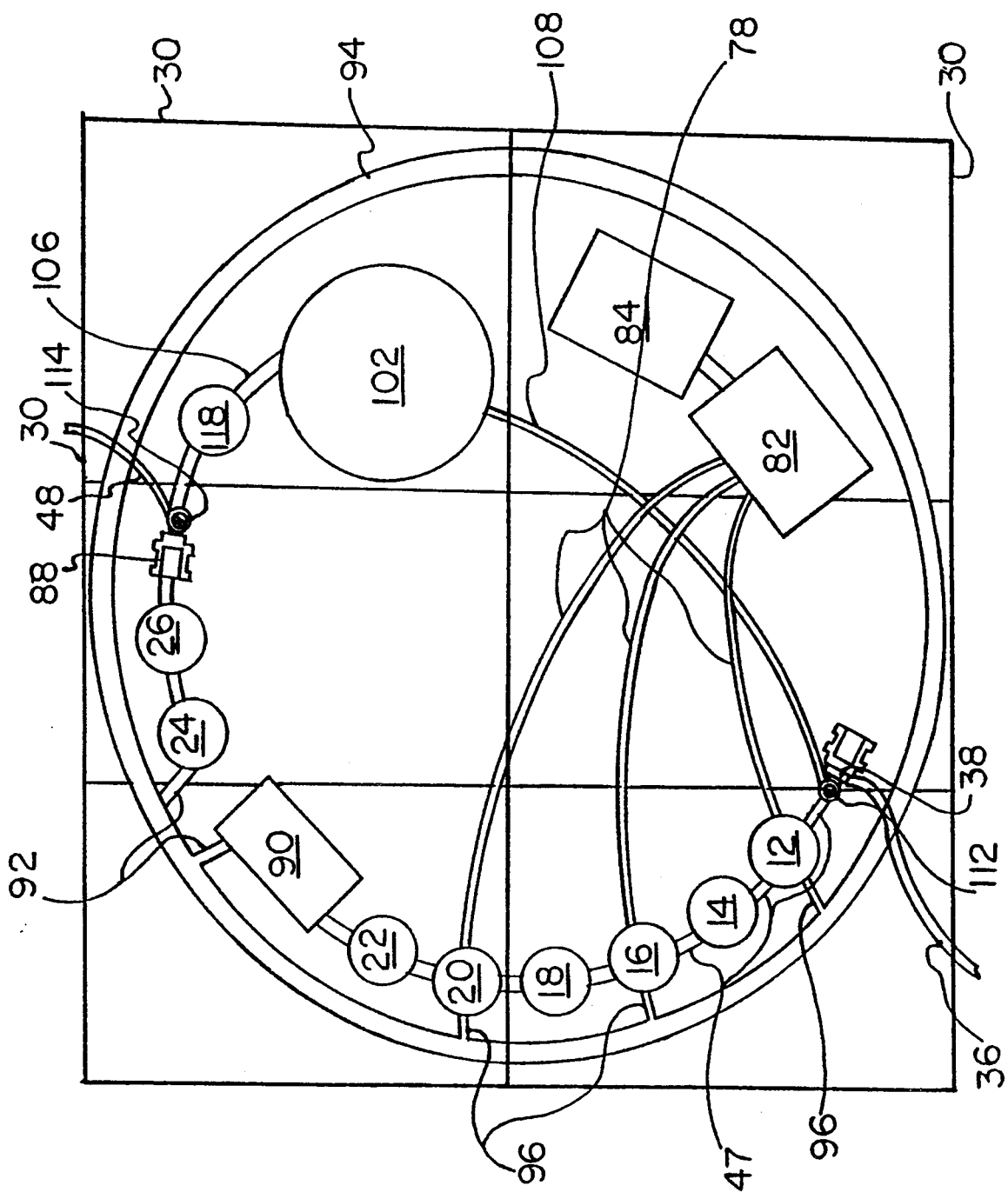
FIG. 4 is a plan view of the apparatus and component elements of FIGS. 1, 2 and 3.
Figure 5:
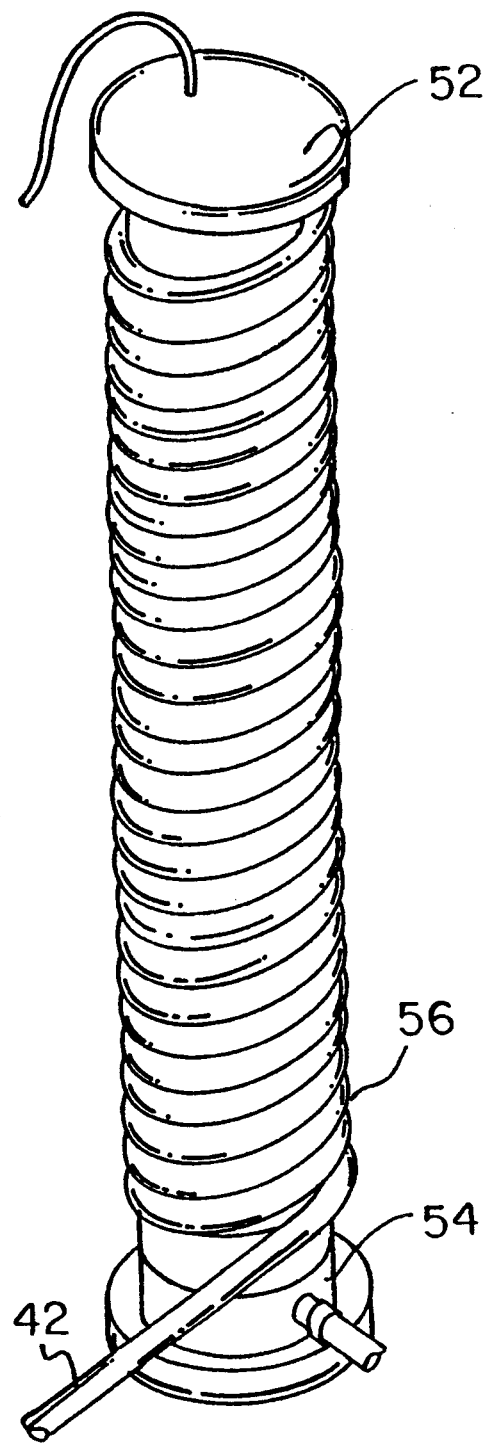
FIGS. 5 and 6 are perspective views of the reaction chambers apparatus shown in FIGS. 1, 3 and 4, with FIG. 6 having its external tubing removed.
Figure 6:
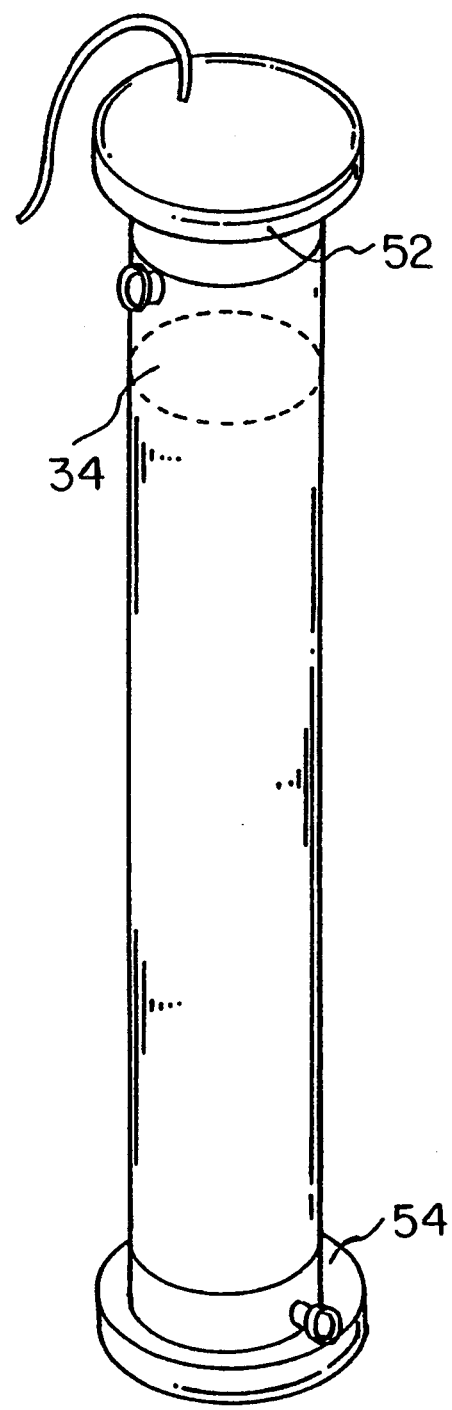
Figure 7:
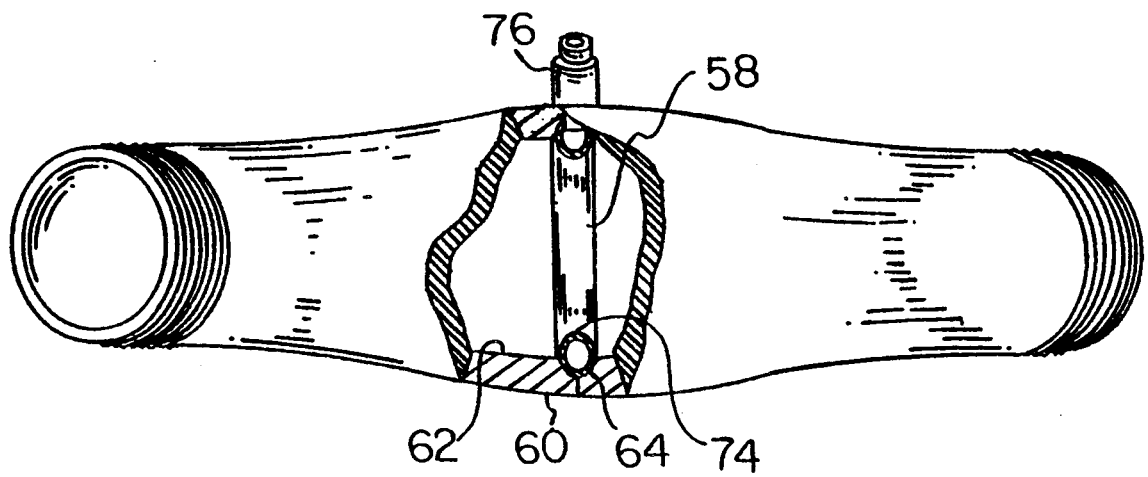
FIG. 7 is a perspective view, partly in section, of the injector of the prior Figures.
Figure 8:
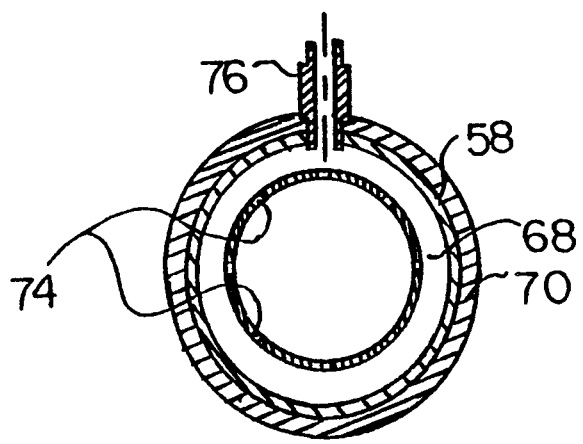
FIG. 8 is a cross-sectional view taken centrally through the injector shown in FIG. 7.

Shown in FIGS. 1 through 8 are various views of the primary embodiment of the system 10 for purifying water constructed in accordance with the principles of the present invention.

From an overview standpoint, the system 10 for purifying water is adapted for use with waste water, ground water, surface treatment, recycling and the like. The system is readily installed on site for producing clean water discharges of polluted water sources. Waste water treatment normally consists of purification to rid the water of pathogenic bacteria or viruses or for removal of particulate material. Further, the treatment of waste water also normally involves the removal of heavy metals therefrom for immediate use or re-use of the water.

More specifically, the system for purifying water includes a plurality of containers or chambers 12, 14, 16, 18, 20, 22, 24 and 26. Further, the containers are supported on modules 28 for being grouped together in a configuration for a particular application. The use of modules with system components thereon allows for the transportation of the system in smaller units with ease of assembly at the site. The containers form a series of proprietary reaction chambers for containing a particulate material 34 for the destructing of organic compounds and biomass. In the preferred embodiment, the containers are vertically extending columns of a cylindrical configuration.

The system further includes a quantity of particulate material 34 formed of trace mineral granules located within each of the containers 14 through 24. The particulate material functions as a catalyst and is adapted to remove contaminants from water contacting the particulate material as the water passes through the containers. The particulate material increases the speed of the chemical reactions within the containers. However, the particulate material itself does not undergo any chemical change. The system redirects energy from the oxidation of organic compounds from one reaction to drive further reactions in a cascade of energy transfers thereby yielding maximum treatment of the water at a low ozone consumption rate. The particulate material adsorbs on its surface a monomoleculate layer of reactant pollutants. The monomolecular layer allows surface reactions to occur in an environment requiring low penetration of further reactant pollutants thereby increasing the overall reaction rate with the particulate material. In the preferred embodiment, the particulate material, is a commercially available material sold by Lake Industries of Atlanta, Ga., under the trade name of ECOLYTE. The particular material is any one of several commercially available materials. In the preferred embodiment, the material consists principally of managanese dioxide in excess of 99 percent. The manganese dioxide is present in combination with further added materials is amounts to enhance the catalytic properties of the managanese dioxide. Such material is in the form of granules. The further materials are essentially as follows:

| | |
|---|---|
| Aluminum | 0.29 mg/g |
| Copper | 9.07 µg/g |
| Iron | 0.50 mg/g |
| Magnesium | 0.03 mg/g |
| Manganese | 623.42 mg/g |
| Nickel | 34.95 µg/g |
| Silicon | 0.19 mg/g |
| Zinc | 3.76 µg/g |

In the chart, the first column represents the material found. The next columns show the detected quantities for each detected material. Other like media, commercially available or other, could be readily used. Even though the particulate material increases the speed at which chemical reactions occur within the containers, the particulate material does not affect the equilibrium of the reactions. However, as the forward reaction within the containers increases, the reverse action increases at a corresponding rate. The system overcomes the reverse reaction by circularly recycling and/or adding additional units to the system.

The system for purifying water further includes a plurality of pipes. A first or input pipe 36 feeds water by a feed pump 38 to the first container 12 from a source containing the water to be treated. Furthermore, additional pipes 42 then feed water sequentially to each subsequent container form the previous container. Finally, an output pipe 48 feeds treated water from the last container for reuse. The pipes are arranged such that water is fed into the containers adjacent to their tops 52. Further, the pipes are arranged to feed water from the containers adjacent to their bottoms 54. The pipes at the top and bottom of each container is preferably provided with a manifold interior of the container to increase the surface then contact between particulate material and water to be purified.

Additionally, the pipes include portions or tubing 56 arranged in a spiral manner to wrap the tubing around each container. Note FIG. 5. The pipes are wrapped around each container starting from a lower portion of the container and continuing to an upper portion of the container prior to the pipe feeding water into the container. This arrangement provides for enhanced ozonation of the water prior to entering the container.

The system for purifying water further includes injectors 58. The injectors are operatively associated with the plurality of pipes 42. The injectors are positioned in the pipes or lines advance of each of the containers. The injectors inject ozone into a pipe containing flowing water to be ozonated prior to the feeding of water to the containers. In the preferred embodiment, the pipes have a section with a predetermined outer diameter 60 and with an predetermined inner diameter 62 to form an annular chamber 64 there between for receiving the injectors. Further, the outer diameter and the inner diameter of the injectors and the pipes, including the annular chamber 64 have a common axis.

The injectors 58 are each in the form of a torus-shaped hollow tube located within the annular chamber 64. The inner diameter 68 of the injector is substantially the same diameter as the inner diameter 62 of the pipes. Further, the outer diameter 70 of the injector is substantially the same as the inner diameter 62 of the pipes. The torus-shaped hollow tube has a plurality of inwardly facing apertures 74 formed through the interior surface of the tube facing the axis of the pipe. In the preferred embodiment, the apertures have a diameter of between about 1/16 and 1/32 inches.

Additionally, a fitting 76 extends from interior of the torus-shaped hollow tube of the injector 58 to exterior of the pipes. Lines 78 are coupled to the fittings 76 for feeding ozone through the fittings into the interior of the torus-shaped hollow tubes to feed ozone through the apertures 74 into water flowing through the associated pipe. Such lines 78 extend between the ozonator 82 and the injectors 58. In the preferred embodiment, the injectors are only placed in advance of some of the chambers 12, 16 and 20 since sufficient residual ozone exists to act with the media at the subsequent chambers 14, 18 and 22.

The system further includes an ozonator 82. The ozonator 82 is coupled to an air pump 84 for constituting an air supply. The air pump 84 feeds air to the ozonator 82 through lines and fittings into the injectors to feed the ozone into water flowing through the pipe and injector 58.

The system further includes a feed pump 38. The feed pump feeds water through the pipes, injectors and containers in a continuous and automatic cycle of operation for the purification of the water. Additionally, the system may include a supplemental back wash pump 88 for reversing the flow of water in the system. The flow reversal allows the system to be cleaned through a back washing process.

The system for purifying water also preferably includes a sand filter 12 as the first chamber. The sand filter 12 receives water that is to be treated prior to being fed to the first catalytic container 14. The sand filter 12 removes particulate material from the water to be further treated by the system.

Additionally, the system further includes an ultra violet device 90. The ultra violet device receives water after being fed from the last of the containers 22 of the first group of containers. The ultra violet device 90 emits ultra violet light for passing through the water and produces hydroxyls in combination with ozone for providing a continuing oxidation and disinfection process. The ultra violet device acts in conjunction with the ozone contained within the water to photo-ionize toxic organic pollutants. Lines 92 couple the ultraviolet device 90 with an extended pipe assembly 94 and the extended pipe assembly 94 to the next following chamber 24, the final catalytic container.

The extended pipe assembly 94 is included in the system for additionally purifying water through extended ozonation. The extended pipe assembly 94 follows the ultra violet device 90. Furthermore, tubing 96 couples the containers 12, 16 and 20 with the extended pipe assembly 94. The tubing 96 is for injecting residual ozone from at least some of the containers into the extended pipe assembly at predetermined locations for continuous oxidation and ozonation process. Additionally, the extended pipe assembly 94 is constructed in a stacked, generally cylindrical configuration to constitute an enclosure 98 for the containers. An opening 100 constitutes a doorway 100 for an operator to enter the enclosure for monitoring the system 10. The extended pipe assembly could be configured circular, rectangular, square, etc. as a function of the requirements of the particular site.

A catalytic conversion chamber 24 and a carbon filter 26 are also incorporated into the system for purifying water. The carbon filter receives the water after being fed from the ultra violet device and extended pipe assembly 94. The carbon filter 26 polishes the water prior to being discharged from the system for re-use.

Finally, a back wash tank 102 is incorporated into the system for purifying water. The back wash tank 102 receives water and stores it for back washing the system. The back wash tank 102 is filled with purified water from the system before its discharge. Furthermore, as the system is back washed, all the back wash water is contained within the system and back wash tank. There is no discharge from the system during back washing.

In order to effect the back washing in a closed loop configuration, the back wash tank is coupled through lines at its input and output ends to the input and output lines 106 and 108 of the system. At the coupling of the input and output lines of the system with the input and output lines of the back wash tank, valves 112 and 114 are provided to effect the proper flow of water for the intended purposes. Specifically, during the normal cleaning of water, such water is fed by the primary feed pump 38 through the various chambers and out of the system without the involvement of the back wash tank. It is preferred, however, that when the back wash tank is low, valves 112 and 114 adjacent to the input and output lines 36 and 48 of the system is redirected to cause an appropriate flow of water, not out of the system, but to the back wash tank 102 to effect its fillings. During continued purifying of water, however, the valve is oriented to direct the flow of water out of the system away from the back wash tank.

In order to back wash, the primary feed pump 32 is inactivated and the valves 112 and 114 are switched so that new water cannot enter the system nor can purified water leave the system. The back wash pump 88 is then activated to effect the flow of water through chambers in a direction reversed from that as previous described. The water flows through the reaction chambers in reverse direction pushing the contaminants back to the sand chamber 12 and then to the back wash tank 102. Such flow includes movement of the water through a screen filter 118, for collecting contaminant particulate material to be disposed of. A typical bag filter is one commercially available from Rosedale Manufacturing of Ann Arbor, Mich., and marketed as an industrial fluids separator tank; other like filters, commercially available or otherwise, could readily be utilized. The reverse flow for the back wash employees clean water previously purified by the system. After the appropriate cleaning time, the back wash pump 88 is inactivated, the valves 112 and 114 are reversed and the primary feed pump 38 energized to continue the purification process in a continuing and automatic cycle of operations.

In the operation and use of the system of the present invention, there is provided a method of purifying flowing water. The method includes the steps of first providing containers 12 through 26 as described above. The containers 14 through 24 form catalytic reaction chambers through which water flows. The catalytic containers contain a particulate material 34 for the destruction of organic compounds and biomass. Further, included in the method is loading a quantity of particulate material formed of trace mineral granules, as described above, within the containers. The particulate material is adapted to remove contaminants from the water when such water flows in contact with the particulate material. Additionally, the particulate material is adapted to remove contaminants from the water by catalytic conversion when the water to be purified flows in contact with the particulate material. Subsequently, the method includes the step of feeding water to the containers through first pipes. The first pipes feed water to the first container from a source containing the water to be treated. The pipes are arranged such that water is fed into the containers adjacent to their tops 52 are from the containers adjacent to their bottoms 54. Ozone is injected into the water flowing through injectors 58 in the first pipes. The ozone initially purifies the water prior to the feeding of the water to the containers. The water is further purified by feeding the ozonated water from the first pipes to the containers. The water is maintained in flowing contact with the particulate material to achieve further purification. Ensuingly, is the step of feeding the further purified water from the container through a second pipe 94 with additional purifying is the water occurring when flowing through the second pipe by injecting residual ozone from the containers into the second pipe. The combination of media with ozonation renders the composite purification far superior than the media and ozonation if done individually.

The method thereby includes the step of feeding water from one of the pipes into the first catalytic container 14. At the first container is for the removal of loosely bonded contaminants, such as humus and grit. The removal of contaminants is effected by catalytic conversion from the water. Further, the method includes the step of feeding water from another of the pipes from the first container to the second catalytic container 16. Within the second container intermediate contaminants, such as colloidal materials, along with any residual loosely bonded contaminants not removed in the first container are removed. The removal of the contaminants from the water is by catalytic conversion of the contaminants. Finally, the method includes the step of feeding water from others of the pipes from the second container to the third and subsequent containers 18, etc. Within the third and subsequent containers removal from the water by catalytic conversion of tightly bonded contaminants such as bacteria and virus along with any residual loosely and intermittently bonded contaminants not removed in the first and second containers is effected.

The method further includes the step of ozonating the water prior to its introduction into the chambers.

The present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

Now that the invention has been described,
What is claimed is:

1. A system for the purifying of water passing through the system, the system comprising in combination:

- a plurality of vertically extending catalytic reaction chambers including a first chamber, a second chamber and at least one subsequent chamber;
- a quantity of particulate material formed of mineral granules comprised principally of manganese dioxide the granules further containing additional minerals in limited amounts, the particulate material being located within the first and second chambers for catalytically removing contaminants from the water contacting the granules as the water passes through the first and second chambers;
- a plurality of pipes, including a first pipe, a second pipe, and at least one subsequent pipe, the first pipe being connected to the first chamber for feeding the water from outside the system into the first chamber, the second pipe being in fluid communication with the first chamber and the second chamber for feeding the water from the first chamber to the second chamber and the subsequent pipe being connected to each subsequent chamber for feeding the water therefrom;
- a first ozone injector connected with the first pipe in advance of the first chamber and in fluid communication therewith for injecting ozone into the water upstream of the first chamber, and a second ozone injector connected with the second pipe and in fluid communication therewith for injecting ozone into the water between the first and second chambers;
- a sand filter connected to the first pipe in advance of the first injector for the removal of particulate material from the water;
- an ultra violet device to for the production of hydroxyl ions connected to a subsequent chamber to further treat the water such that a continuing oxidation and disinfection process is provided;
- an extended pipe assembly connected to the outlet of the ultra violet device wherein the reaction chambers and extended pipe assembly are connected by tubing for injecting residual ozone from the chambers to the extended pipe assembly for continuous oxidation and ozonation, the extended pipe assembly being spirally wrapped to form a continuous loop, said spirally wrapped continuous loop defining an enclosure, the first, second, and subsequent chambers being disposed within said enclosure;
- a carbon filter connected to the outlet of the extended pipe assembly for the polishing of the water;
- a back wash tank connected to the reaction chambers to receive and store water for back washing the system; and
- pump means for feeding the water through the plurality of pipes, sand filter, reaction chambers, injectors, extended pipe assembly, and carbon filter in a continuous and automatic cycle of operation while injecting ozone into the first pipe and the second pipe.

* * * * *